(12) United States Patent
Hafer et al.

(10) Patent No.: US 12,469,594 B1
(45) Date of Patent: Nov. 11, 2025

(54) PREDICTIVE WORK ORDER DEVICES, SYSTEMS, AND METHODS

(71) Applicant: TRIMEDX, LLC, Indianapolis, IN (US)

(72) Inventors: Dax C. Hafer, Indianapolis, IN (US); Robert F. Cadick, Indianapolis, IN (US); Cale R. Clinkenbeard, Westfield, IN (US)

(73) Assignee: TRIMEDX, LLC, Indianapolis, IN (US)

( * ) Notice: Subject to any disclaimer, the term of this patent is extended or adjusted under 35 U.S.C. 154(b) by 475 days.

(21) Appl. No.: 17/672,517

(22) Filed: Feb. 15, 2022

(51) Int. Cl.
G16H 40/40 (2018.01)
G06Q 10/0631 (2023.01)

(52) U.S. Cl.
CPC ..... G16H 40/40 (2018.01); G06Q 10/063114 (2013.01)

(58) Field of Classification Search
CPC ............ G16H 40/40; G06Q 10/063114
See application file for complete search history.

(56) References Cited

U.S. PATENT DOCUMENTS

| | | | |
|---|---|---|---|
| 6,229,869 B1 * | 5/2001 | Hu | A61B 6/4447 378/4 |
| 6,912,481 B2 | 6/2005 | Breunissen | |
| 7,114,850 B2 | 10/2006 | Dong | |
| 10,579,928 B2 | 3/2020 | Wang | |
| 10,692,053 B2 | 6/2020 | Viswanath | |
| 2015/0160098 A1 * | 6/2015 | Noda | G01M 99/00 702/35 |
| 2018/0150804 A1 * | 5/2018 | Clark, Sr. | G06Q 10/063114 |
| 2020/0185085 A1 | 6/2020 | Mavrieudus | |
| 2022/0378384 A1 * | 12/2022 | Ji | A61B 6/4435 |

FOREIGN PATENT DOCUMENTS

WO  2019/201997  10/2019

OTHER PUBLICATIONS

Wong et al., CT brain artefact due to air bubbles in the oil cooling system: characteristic band like configuration on sagittal reformatted image, 36 JPN J of Radiology 90-95 (Year: 2018).*
Hendrick et al., Computed Tomography Artifact Created by Air in the X-ray Tube Oil, 40(1) J of Computer Assisted Tomography 67-70 (Year: 2016).*

* cited by examiner

*Primary Examiner* — Jordan L Jackson
(74) *Attorney, Agent, or Firm* — Faegre Drinker Biddle & Reath LLP (57) ABSTRACT

Systems for evaluating a plurality of medical devices over an at least one network are provided. The systems may include an event detection controller, a plurality of network access devices, and a plurality of technician mobile computing devices. Each network access device may be operatively coupled to a respective one of the plurality of medical devices. Each network access device may receive log data from the respective medical device and process the log data to provide a collection of device data to the event detection controller over the at least one network. The event detection controller may evaluate the collection of device data to identify a plurality of events and generate one or more work orders based on the plurality of events. An exemplary event may be an air bubble event for a CT scanner.

20 Claims, 10 Drawing Sheets

PREDICTIVE WORK ORDER DEVICES, SYSTEMS, AND METHODS

TECHNICAL FIELD

The present disclosure is related to devices, systems, and methods to evaluate medical devices and in particular to devices, systems, and methods to evaluate medical devices in the field and generate and manage work orders.

BACKGROUND

Various industries, including the healthcare industry, desire to maintain various devices, such as medical drives, in working order. Medical devices have standard maintenance schedules, but there is a desire to determine potential issues and generate work order to evaluate the medical device to proactively head off more costly repairs, improve device availability and performance.

SUMMARY

Aspects of the present disclosure relate to systems, devices, and methods to evaluate medical devices in an efficient manner. In some instances, the characteristics of multiple medical devices are evaluated and for one or more events with event detection systems. Once the characteristics of the multiple medical devices are evaluated, medical devices having one or more associated events results in work orders being generated. An advantage, among others, of this approach is the ability to quickly evaluate and detect potential problems with a medical device and to generate work orders based thereon. Additional advantages will be apparent to one of skill in the art based on the following disclosure.

In an exemplary embodiment of the present disclosure, a system for evaluating a plurality of medical devices including a CT scanner over at least one network. The system comprising an event detection controller and a plurality of network access devices. Each network access device operatively coupled to a respective one of the plurality of medical devices. Each network access device receiving log data from the respective medical device and processing the log data to provide a collection of device data to the event detection controller over the at least one network. The event detection controller is configured to: query the device data associated with the CT scanner to determine if any view corrections were executed for tilted scans; evaluate a plurality of processing strategies to determine if an air bubble event is detected, each processing strategy of the plurality of processing strategies being able to independently determine if the air bubble event is detected; and if the air bubble event is detected, generate a work order for the CT scanner.

In an example thereof, a first processing strategy of the plurality of processing strategies includes determining if a percent of tilted scans with view corrections satisfies a first threshold and if the first threshold is satisfied, determining the air bubble event is detected. In a variation thereof, the first threshold is satisfied if the percent of tilted scans with view corrections at least meets the first threshold.

In another example thereof, a second processing strategy of the plurality of processing strategies includes determining if a percent of tilted scans with view corrections satisfies a second threshold. In a variation thereof, the second threshold is satisfied if the percent of tilted scans with view corrections exceeds the second threshold and the second processing strategy of the plurality of processing strategies further includes determining if the percent of tilted scans with view corrections satisfies a third threshold. In a further variation thereof, the third threshold is satisfied if the percent of tilted scans with view corrections is less than the third threshold and the second processing strategy of the plurality of processing strategies further includes determining if a percent view corrections on tilted scans satisfies a fourth threshold. In another variation thereof, the fourth threshold is satisfied if the percent of view corrections on tilted scans exceeds the fourth threshold and the second processing strategy of the plurality of processing strategies further includes determining if a number of tube arcs satisfies a fifth threshold. In a further still variation thereof, the fifth threshold is satisfied if the number of tube arcs exceeds the fifth threshold and the second processing strategy of the plurality of processing strategies further includes determining if the number of tube arcs satisfies a sixth threshold. In yet another variation thereof, the sixth threshold is equal to an average number of tube arcs over a first time period plus a standard deviation of the average number of tube arcs over the first time period. In a further still variation thereof, the sixth threshold is satisfied if the number of tube arcs exceeds the sixth threshold. In yet a further still variation thereof, if the first threshold, the second threshold, the third threshold, the fourth threshold, the fifth threshold, and the sixth threshold are satisfied, determining the air bubble event is detected.

In another exemplary embodiment of the present disclosure, a system for evaluating a plurality of medical devices over an at least one network is provided. The system comprising: an event detection controller; a plurality of network access devices; and a plurality of technician mobile computing devices. Each network access device is operatively coupled to a respective one of the plurality of medical devices. Each network access device receiving log data from the respective medical device and processing the log data to provide a collection of device data to the event detection controller over the at least one network. The event detection controller is configured to: receive the collection of device data; evaluate the collection of device data to identify a plurality of events; generating a first work order based on a first event of the plurality of events, the first event being associated with a first medical device of the plurality of medical devices and having a first severity level; generating a second work order based on a second event of the plurality of events, the second event being associated with a second medical device of the plurality of medical devices and having a second severity level, the second severity level being higher than the first severity level; sending a first notification of the first work order to a first technician mobile computing device within a first time period; and sending a second notification of the second work order to a second technician mobile computing device within a second time period, the second time period being shorter than the first time period.

In an example thereof, the event detection controller is further configured to: determine a third event of the plurality of events for the first medical device of the plurality of medical devices; determine if the first work order is still open; if the first work order is still open, update the first work order to include the third event; and if the first work order is closed, generate a third work order based on the third event of the plurality of events.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
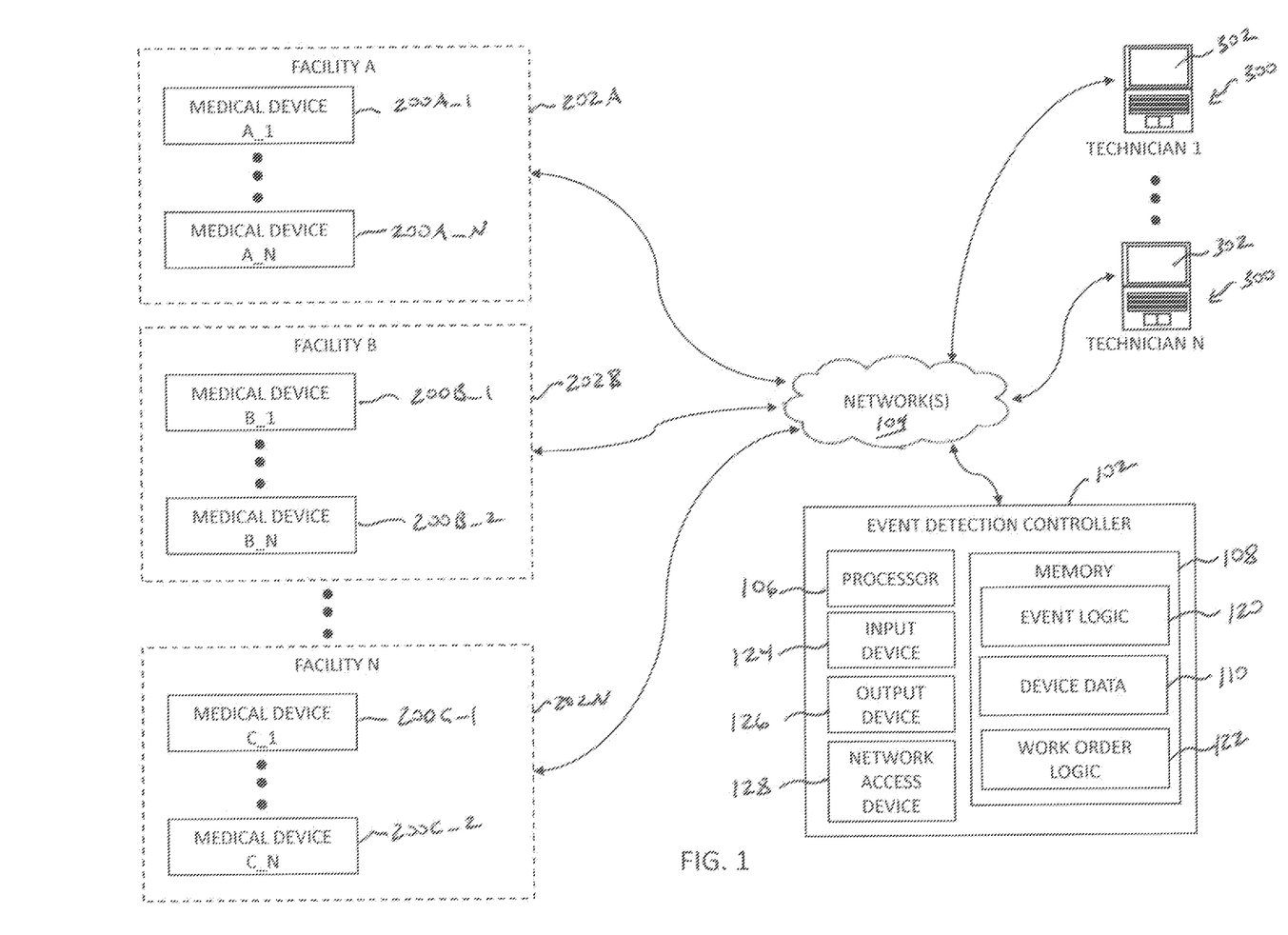
FIG. 1 illustrates an overview of an example system for evaluation of medical devices located at various facilities.

Referring to FIG. 1, an exemplary medical device evaluation and work order system 100 is shown. Medical device evaluation and work order system 100 includes an event detection controller 102, a plurality of medical devices 200 which are accessible by event detection controller 102 over one or more networks 104, and a plurality of mobile technician computing devices 300. Medical devices 200 are located at a plurality of different facilities 202. Additionally, medical devices 200 may be from a plurality of manufacturers and be a plurality of different types. Exemplary medical devices include computerized tomography (CT) scanners, MRI scanners, and other suitable types of medical devices. Further, the facilities 202 may be owned by differing entities, such as different hospital groups, and event detection controller 102 may be provided by a clinical engineering (CE) company that provides technician service and maintenance of medical devices 200 for each of the hospital groups, and hence each of the facilities.

Event detection controller 102 may be a single computing device or a plurality of computing devices which are able to communicate over one or more networks 104. Event detection controller 102 includes a processor 106 or a plurality of processors having access to a memory 108. Memory 108 may be local to event detection controller 102 or accessible across one or more networks 104.

Memory 108 may be a single memory or a distributed memory. Memory 108 includes medical device data 110 which includes records on the various medical devices 200 being monitored by medical device evaluation and work order system 100. Exemplary medical device data 110 includes log files generated by the respective medical devices 200 and other suitable information. In embodiments, medical device data 110 does not contain any electronic personal health information (ePHI) regarding the patients utilizing the respective medical device 200.

Memory 108 further includes event logic 120 and work order logic 122. Event logic 120 includes various test criteria that the medical device data 110 is analyzed against to determine if a work order should be generated or not. The test criteria are developed to predict when a maintenance should be performed to avoid breakdowns and further, potentially more expensive and time consuming, repairs. Work order logic 122 generates and manages work orders which are assigned to technicians and available on mobile technician computing devices 300.

Event detection controller 102 further includes one or more input devices 124, output devices 126, and a network access device 128. Exemplary input devices include keyboards, switches, touch screens, roller devices, microphones, and other suitable devices whereby operator input may be provided to event detection controller 102. Exemplary output devices include displays, speakers, lights, printers, and other suitable devices whereby event detection controller 102 may provide information to operators of event detection controller 102. Network access device 128 connects event detection controller 102 to at least one network 104.

The illustrated mobile technician computing devices 300 are laptops having touch screens 302 which function both as input devices to provide information to mobile technician computing devices 300 and output devices to provide information to a technician using mobile technician computing devices 300. Mobile technician computing devices 300 further include at least one processor which executes medical device work order logic, such as an application, and a network access device which connects the mobile technician computing device 300 to network 104. Exemplary network access devices include cellular antennas and wifi antennas. Medical device work order logic receives work orders from event detection controller 102 and present them to the technician. Further, the medical device work order logic may receive input from the technician regarding a work order that is provided to event detection controller 102.

Mobile technician computing devices 300 may be carried by a technician during normal working hours. Exemplary mobile technician computing devices 300 include cellular phones, such as the iPhone available from Apple located at One Apple Park Way in Cupertino, CA 95014, smart watches, such as the Apple Watch also available from Apple, tablet devices, such as the iPad also available from Apple, laptops, and other portable computing devices.

Figure 2:
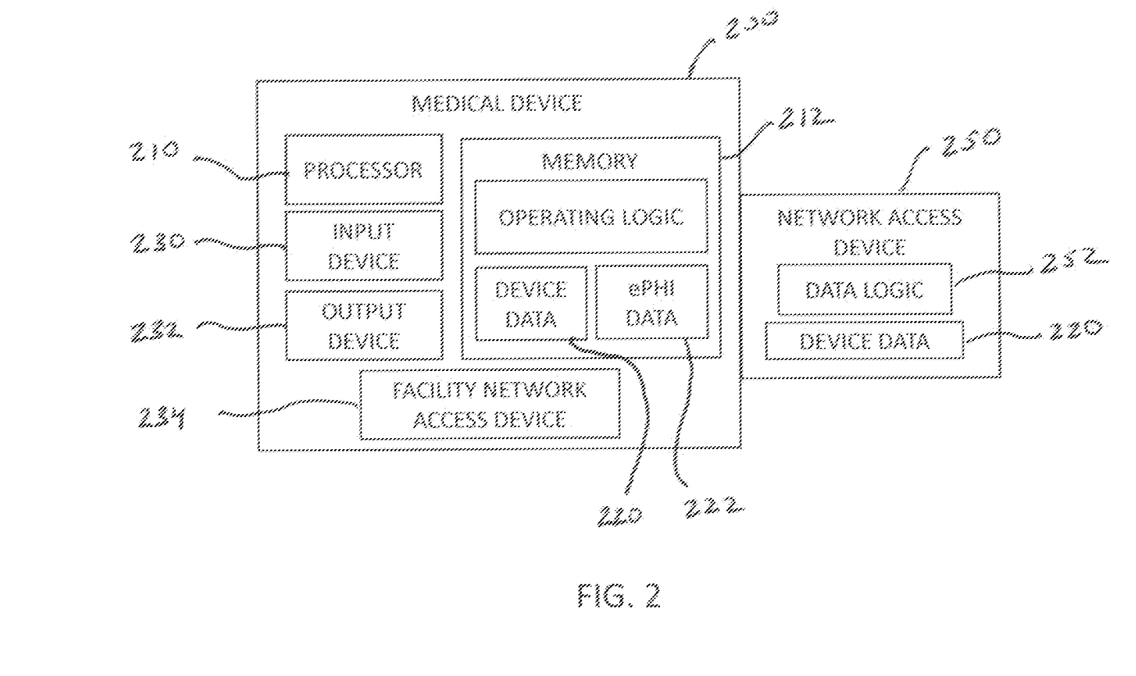
FIG. 2 illustrates a representative view of an exemplary medical device customers.

Referring to FIG. 2, an exemplary medical device 200 is shown. Medical device 200 includes a processor 210 or multiple processors having access to a memory 212. The memory may be a single memory or distributed memory.

Memory 212 includes operating logic 214 which operates the medical device, such as imaging logic for an MRI or CT scanner. Memory 212 further includes device data 220 and ePHI data 222. In embodiments, both device data 220 and ePHI data 222 related to an operation performed by the medical device 200 on a patient.

Medical device 200 further includes one or more input devices 230, output devices 232, and a network access device 234. Exemplary input devices include keyboards, switches, touch screens, roller devices, microphones, and other suitable devices whereby operator input may be provided to event detection controller 102. Exemplary output devices include displays, speakers, lights, printers, and other suitable devices whereby medical device 200 may provide information to operators of medical device 200. Network access device 234 connects medical device 200 to a facility network (not shown) so that both of device data 220 and ePHI data 222 may be shared across the facility network. Exemplary network access device 234 includes an Ethernet card, a wifi antenna, and other suitable devices for connecting a computing device to a network.

Medical device evaluation and work order system 100 communicates with medical device 200 through a separate network access device 250. Network access device 250 is a computing device and includes data logic 252 which receives data, such as device data 220, from medical device 200 and periodically communicates the received data to event detection controller 102 over at least one network 104. In embodiments, network access device 250 receives both device data 220 and ePHI data 222 and removes ePHI data 222 from the data set. Exemplary network access device 250 include an Ethernet card, a wifi antenna, and other suitable devices for connecting network access device 250 to event detection controller 102 over at least one network 104.

In embodiments, network access device 250 collects logs of device data 220 in fifteen minute windows. Network access device 250 then opens a virtual private network (VPN) tunnel which transfers the collected logs of device data 220 to event detection controller 102. In embodiments, event detection controller 102 includes a server which receives the collected logs from each medical device 200.

Figure 3:
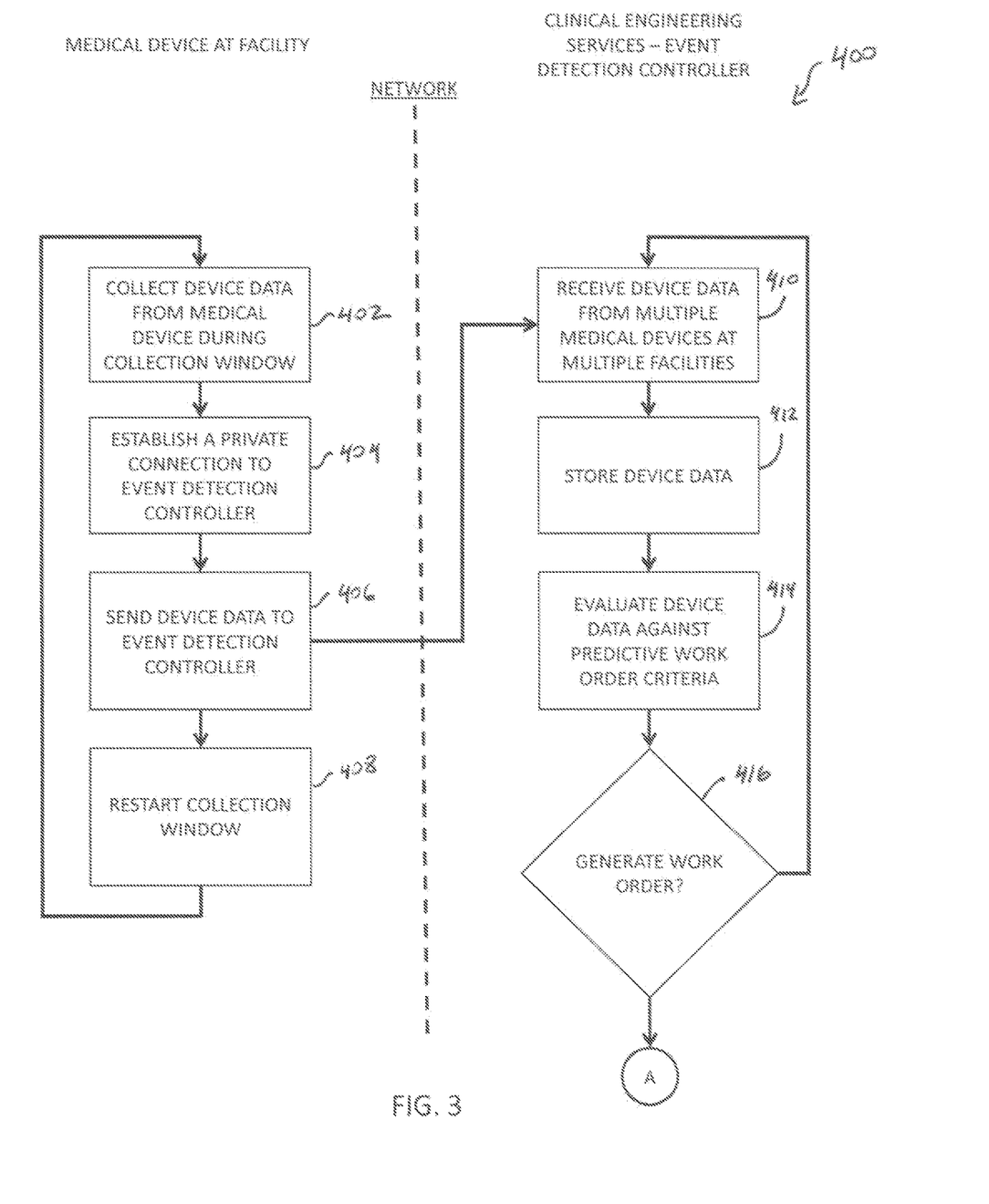
FIG. 3 illustrates an exemplary processing sequence for evaluating medical devices.

Referring to FIG. 3, an exemplary processing sequence 400 of medical device evaluation and work order system 100 is shown. For each medical device 200, the corresponding network access device 250 collects device data 220 from medical device 200 during the collection window, as represented by block 402. Each respective network access device 250 establishes a private connection, such as a VPN, to event detection controller 102, as represented by block 404. The device data 220 is sent from network access device 250 to event detection controller 102, as represented by block 406. The collection window is reset and a new version of device data 220 is collected, as represented by blocks 408 and 402.

Figure 4:
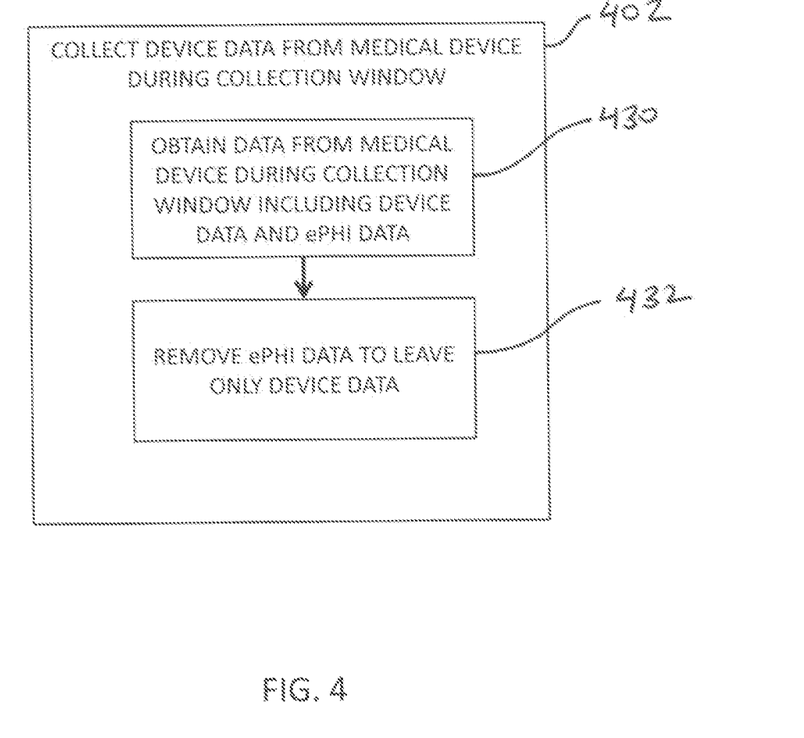
FIG. 4 illustrates an exemplary processing sequence for collecting medical device data for evaluating the medical device.

Referring to FIG. 4, an exemplary embodiment of network access device 250 collecting device data 220 from medical device 200 is shown. In this embodiment, network access device 250 receives from medical device 200 data which includes both device data 220 and ePHI data 222, as represented by block 430. Network access device 250 then removes from the data received the ePHI data 222 and sends only the device data 220 to event detection controller 102, as represented by block 432.

Returning to FIG. 3, event detection controller 102 receives the device data 220 from each medical device 200, as represented by block 410. The device data is stored on memory 108 of event detection controller 102 as medical device data 110 (fp110 is a collection of all of the device data 220 collected from the multiple medical device 200), as represented by block 412. The collected device data is evaluated against various predictive work order criteria, as represented by block 414. Each criteria if true is considered an event and represents a condition at the respective medical device that is indicative of a preventable future issue with the medical device 200 which can be potentially treated by having a technician visit the medical device 200 and perform a preventative maintenance task. If an event is detected a work order is generated, as represented by block 416.

Figure 6:
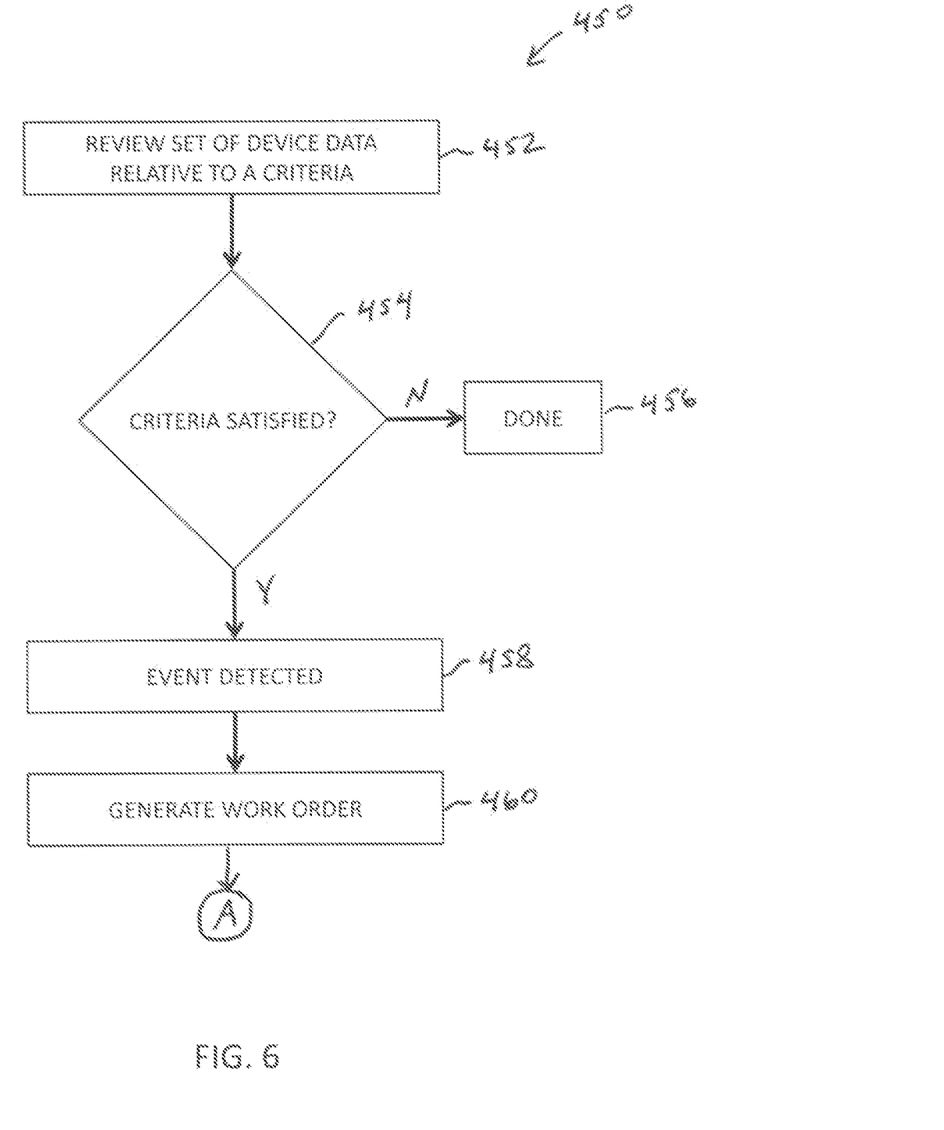
FIG. 6 illustrates a first exemplary processing sequence for evaluating device data against predictive work order scenarios.

Referring to FIG. 6, an exemplary embodiment of a first predictive work order criteria 450 is shown. The device data 110 is reviewed relative to the criteria, as represented by block 452. The criteria may be multi-step and compare various device data values against thresholds or other measures or a single step and compare a first device data value against a threshold or measure. Either way the criteria has one processing strategy that either indicates an event is detected or not and is referred to as a simple event criteria. For example, a single step simple event criteria may be for a medical device 200 having an associated tank of helium whether the level of helium in the tank is below a threshold, such as 50%, 60%, 75%, 80% or other suitable thresholds. If so, an event is detected because for that medical device 200 an insufficient amount of helium is predictive of a future failure. If not, no event is detected.

Returning to FIG. 6, the device data is analyzed against the predictive work order criteria, as represented by block 454. If the criteria is not satisfied, then an event is not detected, as represented by block 456. If the criteria is satisfied, then an event is detected, as represented by block 458, and a work order is generated, as represented by block 460.

Figure 7:
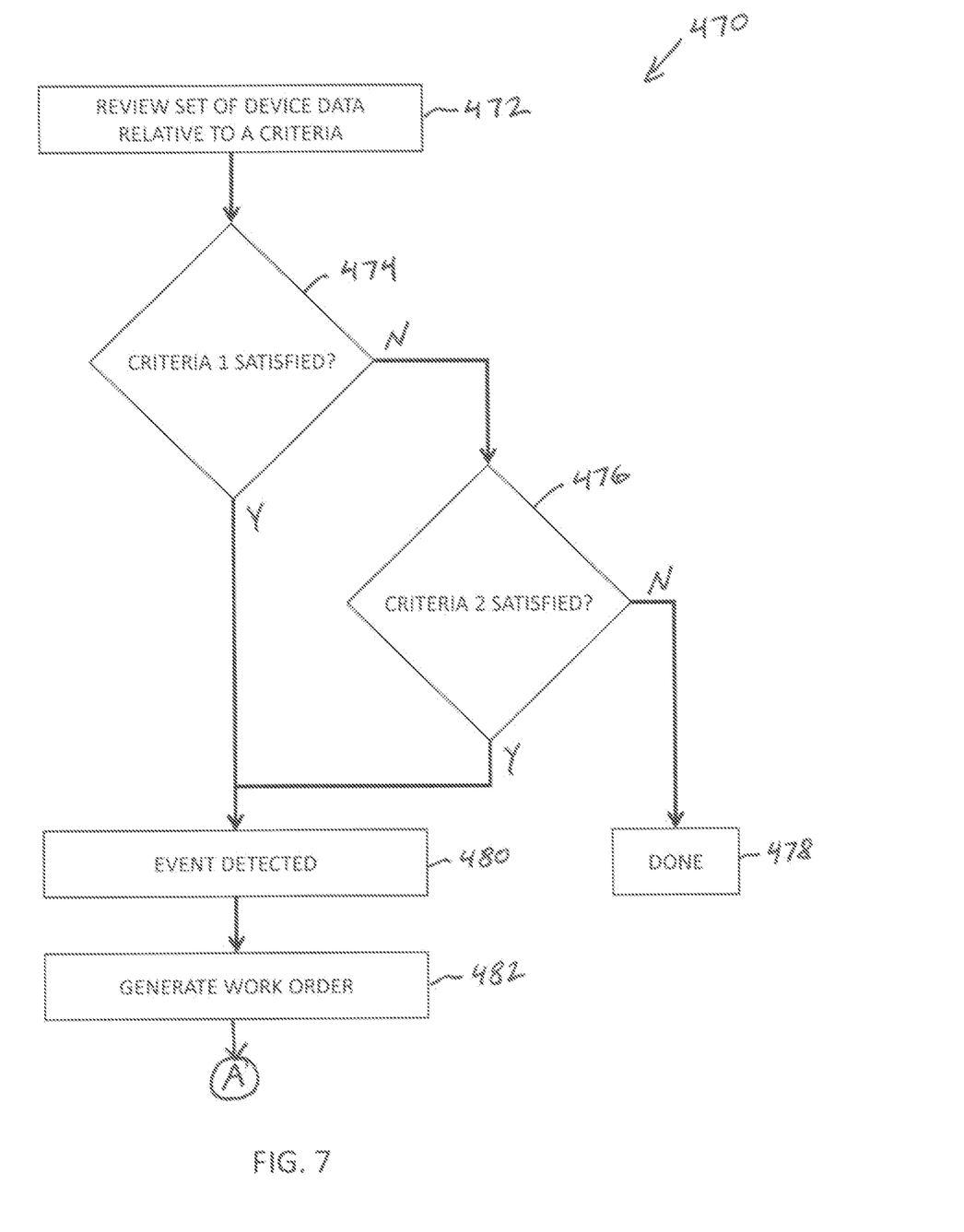
FIG. 7 illustrates a second exemplary processing sequence for evaluating device data against predictive work order scenarios.

Referring to FIG. 7, an exemplary embodiment of a second predictive work order criteria 470 is shown. The device data 110 is reviewed relative to the criteria, as represented by block 472. The criteria has multiple processing strategies, illustratively criteria 1 and criteria 2, each of which may lead to an indication of an event being detected and is referred to as a composite event criteria. Each of criteria 1 and criteria 2 may be multi-step and compare various device data values against thresholds or other measures or a single step and compare a first device data value against a threshold or measure.

The device data is analyzed against the predictive work order criteria 470, as represented by blocks 474 (criteria 1) and 476 (criteria 2). If both criteria 1 and criteria 2 are not satisfied, then an event is not detected, as represented by block 478. If either criteria 1 and criteria 2 is satisfied, then an event is detected, as represented by block 480, and a work order is generated, as represented by block 482.

Figure 5:
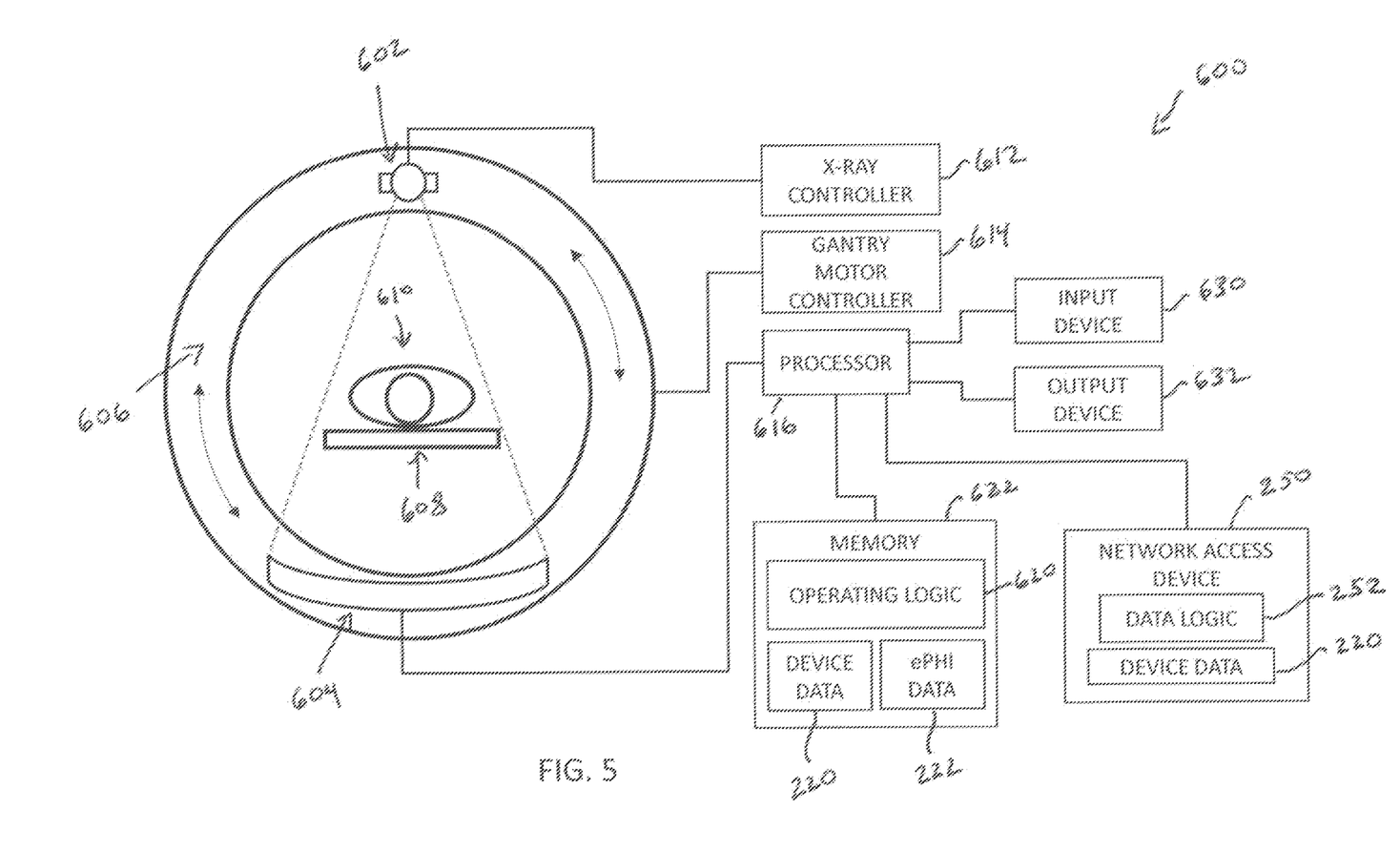
FIG. 5 illustrates a representative view of an exemplary medical device, a CT scanner; screen layout for a mobile technician computing device of the system of FIG. 1.
Figure 8:
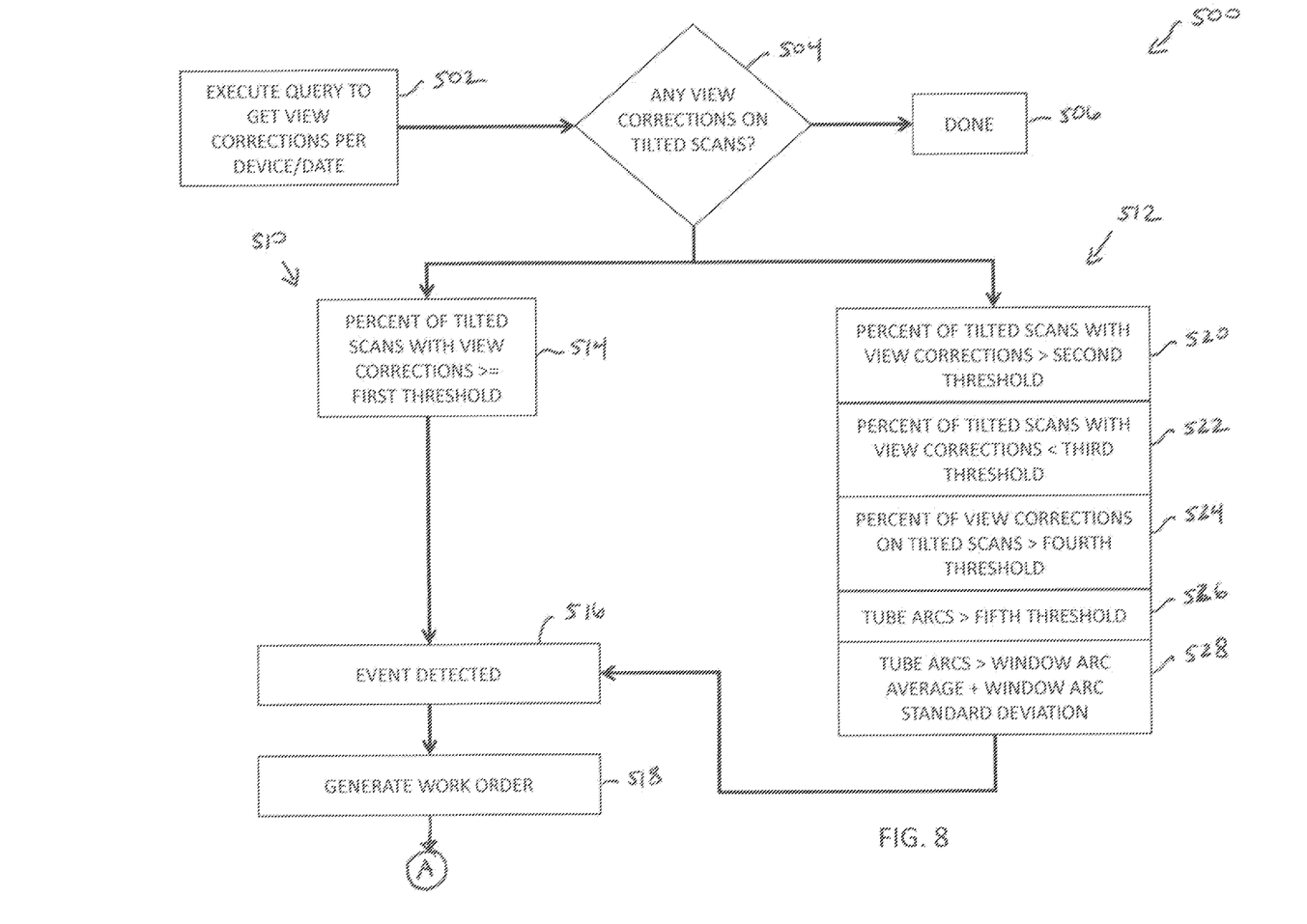
FIG. 8 illustrates a third exemplary processing sequence for evaluating device data against predictive work order scenarios.

Referring to FIG. 8, an air bubble predictive work order processing sequence 500 for the detection of air bubbles in the oil coolant that surrounds an x-ray source 602 of a CT scanner 600 (see FIG. 5). Referring to FIG. 5, CT scanner 600 includes X-ray source 602 and a detection array 604 both mounted on a rotatable gantry 606. Gantry 606 surrounds a table 608 on which a patient 610 is supported. The arrangement of rotatable gantry 606 in FIG. 5 results in CT scanner 600 capturing a non-tilted scan of patient 610. When rotatable gantry 606 is rotated and hence X-ray source 602 and detection array 604 also rotated relative to the patient, a tilted scan of patient 610 may be captured.

X-ray source 602 is controlled by an X-ray controller 612 and rotatable gantry 606 is controlled by a gantry motor controller 614. The image data received by detection array 604 is processed by a processor 616. Each of X-ray controller 612, gantry motor controller 614, and processor 616 are controlled by operating logic 620 stored on a memory 622 of CT scanner 600. Memory 622 further includes device data 220 and ePHI data 222 corresponding to the operation of CT scanner 600. CT scanner 600 further includes one or more input devices 630, output devices 632, and a network access device 250. Exemplary input devices include keyboards, switches, touch screens, roller devices, microphones, and other suitable devices whereby operator input may be provided to CT scanner 600. Exemplary output devices include displays, speakers, lights, printers, and other suitable devices whereby CT scanner 600 may provide information to operators of CT scanner 600.

The presence of air bubbles in the oil coolant around X-ray source 602 may cause a tube arc which is a brief drop in kilovolts in X-ray source 602 which will result in a blip in the stream of data being output by detection array 604. The occurrence of a tube arc is not fatal to a scan. Rather, CT scanner 600 may correct for the blip in the data stream of detection array 604 by looking that the image data just preceding the blip (before data) and subsequent to the blip (after data) and interpolating the before and after data to fill in the blip. This approach is known as a view correction. Device data 220 for CT scanner 600 includes a view angle of the scan (angle of tilt and non-tilted), occurrence of a tube arc, view correction occurrence, and time stamps of each along with other suitable information.

Although a single tube arc is not fatal to a scan if too many tube arcs occur during a scan, operating logic 620 of CT scanner 600 will abort the scan. However, the ongoing occurrence of tube arcs, even if not of a level sufficient to abort scans, may deteriorate the performance of the components of CT scanner 600 leading to a failure and downtime until a repair can be made. Air bubble predictive work order processing sequence 500 analyzes device data 220 to determine when device data 220 indicates the presence of air bubbles in the oil coolant and generates a work order to have a technician remediate the issue before further deterioration of the performance of the components of CT scanner 600 occurs.

Turning to FIG. 8, air bubble predictive work order processing sequence 500 executes a query on medical device data 110 to determine (for the device data 220 from a CT scanner 600 in medical device data 110) the number of view corrections for CT scanner 600 and their corresponding time, as represented by block 502. A determination is made whether any of the view corrections for CT scanner 600 were made on tilted scans, as represented by block 504. In embodiments, the determination is whether any view corrections for CT scanner 600 were made today on tilted scans. If no, then the data does not need further analysis, as represented by block 506. If so, then multiple processing strategies, illustratively processing strategy 510 and processing strategy 512, may lead to a determination that an air bubble event is detected; air bubble predictive work order processing sequence 500 is a composite event detection criteria.

For processing strategy 510, a determination is made whether a percent of the tilted scans with view corrections (tilted scans with view correction/tilted scans) exceeds or equals a first threshold, as represented by block 514. If so, an air bubble event is detected, as represented by block 516, and a work order is generated, as represented by block 518. In embodiments, the first threshold is 33%. In embodiments, processing strategy 510 analyzes scan data for a first time period, such as a day. If the percentage of tilted scans with view corrections does not exceed or equal the first threshold then an air bubble event is not detected by processing strategy 510.

For processing strategy 512, a determination is made of multiple factors, represented by blocks 520-528, each of which must be satisfied for an air bubble event to be detected, as represented by block 516, and a work order is generated, as represented by block 518. In embodiments, processing strategy 512 analyzes scan data for a first time period, such as a day. If any of the factors represented by blocks 520-528 are not satisfied then an air bubble event is not detected by processing strategy 512.

First, a determination is made of a percent of the tilted scans with view corrections (tilted scans with view correction/tilted scans). This percentage of tilted scans with view corrections is compared to a second threshold and is marked true if the percentage of tilted scans with view corrections exceeds the second threshold, as represented by block 520. In embodiments, the second threshold is 10%.

Second, a determination is made whether the percentage of the tilted scans with view corrections is less than a third threshold and is marked true if the percentage of tilted scans with view corrections is less than the third threshold, as represented by block 522. In embodiments, the third threshold is 33%.

Third, a determination is made whether the percentage of view corrections on tilted scans (view corrections for titled scans/view corrections) exceeds a fourth threshold, as represented by block 524. In embodiments, the fourth threshold is 75%.

Fourth, a determination is made whether the number of tube arcs exceeds a fifth threshold, as represented by block 526. In embodiments, the fifth threshold is 5.

Fifth, a determination is made whether the number of tube arcs exceeds a window arc average plus a standard deviation of the window arc average, as represented by block 528. In embodiments, the window is a 10 day average of the number of tube arcs per day.

Figure 9:
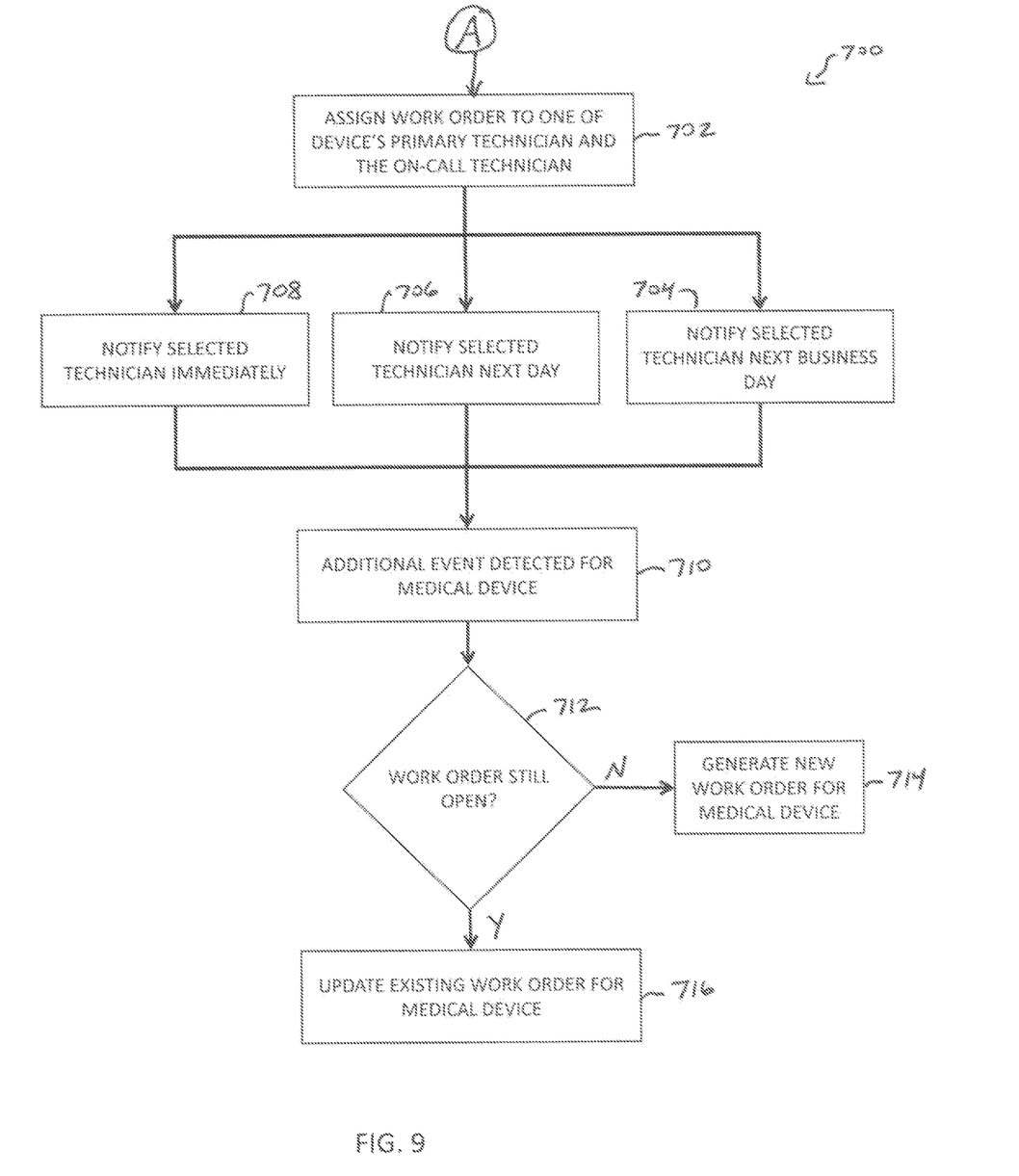
FIG. 9 illustrates an exemplary processing sequence for managing work orders.

Referring to FIG. 9, in response to a work order is to be generated (block 416 in FIG. 2, block 460 in FIG. 6, block 482 in FIG. 7, and block 518 in FIG. 8), a work order management processing sequence 700 is run. The work order itself will identify the medical device 200, location, suspected issue (such as air bubble), and potentially suggested steps to execute. The work order is communicates by event detection controller 102 to the mobile technician computing devices 300 of the assigned technician, as represented by block 702. The assigned technician may be one or both of a primary technician and an on-call technician. A primary technician for the given medical device 200 based on any number of factors, such as the type of the device, the facility served by the technician, the technician location, and other suitable factors.

In embodiments, event detection controller 102 may have assigned severity levels with each event. In an example, each event may have one of a low severity, a medium severity, and a high severity. If the event has a low severity, event detection controller 102 sends a notification to the corresponding technician's mobile technician computing devices 300 the next business day, as represented by block 704. If the event has a medium severity, event detection controller 102 sends a notification to the corresponding technician's mobile technician computing devices 300 the next day, as represented by block 706. If the event has a high severity, event detection controller 102 sends a notification to the corresponding technician's mobile technician computing devices 300 immediately, as represented by block 708. The work order remains open until the technician indicates to event detection controller 102 through mobile technician computing devices 300 that it is complete. The technician may also submit information about false positives to event detection controller 102 through mobile technician computing devices 300. For example, processing strategy 512 of air bubble predictive work order processing sequence 500 generates an air bubble event for CT scanner 600. The technician inspects the CT scanner 600 and determines that either there are no air bubbles or that a different issue existed. The technician may provide feedback through mobile technician computing devices 300 to event detection controller 102 of the false positive for the air bubble event. The information received may be used to alter the factors used in processing strategy 512 of air bubble predictive work order processing sequence 500.

At times, a subsequent same event for a given medical device 200, will also be detected, as represented by block 710. For instance, the scan data for CT scanner 600 for a first scan on a Monday may indicate an air bubble event, the scan data for CT scanner 600 for a second scan on that Monday may not indicate an air bubble event, and the scan data for CT scanner 600 for a third scan on that Monday may indicate an air bubble event. Air bubble predictive work order processing sequence 500 will determine an air bubble event exists for the first scan and indicate a need to generate a work order. Air bubble predictive work order processing sequence 500 will then review the second scan and no air bubble event will be detected. Air bubble predictive work order processing sequence 500 will then review the third scan, determine an air bubble event exists, and indicate a need to generate a work order. Work order management processing sequence 700 will prior to generating the second work order based on the third scan data, see if the work order previously generated for the first scan data remains open, as represented by block 712. If not, a new work order is generated, as represented by block 714. If so, the existing work order is updated to reflect the additional event detection, as represented by block 716.

Figure 10:
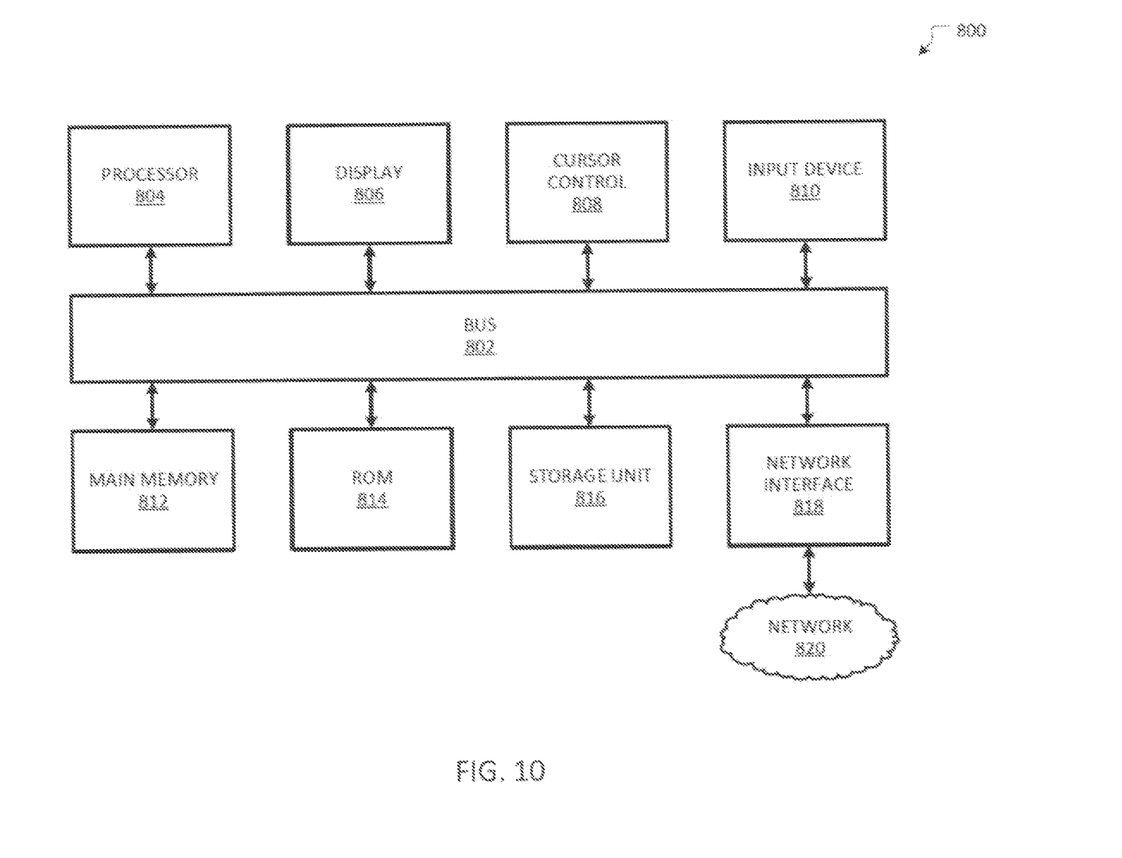
FIG. 10 illustrates a diagram of a computing system for multi-vehicle communication and control.

FIG. 10 illustrates a diagram of a computing system 800 for medical device evaluation and work order system 100. For example, some or all of the functions of event detection controller 102, network access device 250, and mobile technician computing devices 300 may be performed by one or more computing systems that has similar components as the computing system 800. This diagram is merely an example, which should not unduly limit the scope of the claims. One of ordinary skill in the art would recognize many variations, alternatives, and modifications.

The computing system 800 includes a bus 802 or other communication mechanism for communicating information between, a processor 804, a display 806, a cursor control component 808, an input device 810, a main memory 812, a read only memory (ROM) 814, a storage unit 816, and/or a network interface 818. In examples, such memory is a non-transitory computer-readable storage medium. In some examples, the bus 802 is coupled to the processor 804, the display 806, the cursor control component 808, the input device 810, the main memory 812, the read only memory (ROM) 814, the storage unit 816, and/or the network interface 818. And, in certain examples, the network interface 818 is coupled to a network 820 (e.g., the network 104).

In some examples, the processor 804 includes one or more general purpose microprocessors. In some examples, the main memory 812 (e.g., random access memory (RAM), cache and/or other dynamic storage devices) is configured to store information and instructions to be executed by the processor 804. In certain examples, the main memory 812 is configured to store temporary variables or other intermediate information during execution of instructions to be executed by processor 804. For example, the instructions, when stored in the storage unit 816 accessible to processor 804, render the computing system 800 into a special-purpose machine that is customized to perform the operations specified in the instructions. In some examples, the ROM 814 is configured to store static information and instructions for the processor 804. In certain examples, the storage unit 816 (e.g., a magnetic disk, optical disk, or flash drive) is configured to store information and instructions.

Thus, computing system 800 may include at least some form of computer readable media. The computer readable media may be any available media that can be accessed by processor 804 or other devices. For example, the computer readable media may include computer storage media and communication media. The computer storage media may include volatile and nonvolatile, removable and non-removable media, and/or non-transitory media implemented in any method or technology for storage of information such as computer readable instructions, data structures, program modules or other data (memory). The computer storage media may not include communication media.

In some embodiments, the display 806 (e.g., a cathode ray tube (CRT), an LCD display, or a touch screen) is configured to display information to a user of the computing system 800. In some examples, the input device 810 (e.g., alphanumeric and other keys) is configured to communicate information and commands to the processor 804. For example, the cursor control 808 (e.g., a mouse, a trackball, or cursor direction keys) is configured to communicate additional information and commands (e.g., to control cursor movements on the display 806) to the processor 804.

EXAMPLES

Example 1: A system for evaluating a plurality of medical devices including a CT scanner over at least one network. The system comprising an event detection controller and a plurality of network access devices. Each network access device operatively coupled to a respective one of the plurality of medical devices. Each network access device receiving log data from the respective medical device and processing the log data to provide a collection of device data to the event detection controller over the at least one network. The event detection controller is configured to: query the device data associated with the CT scanner to determine if any view corrections were executed for tilted scans; evaluate a plurality of processing strategies to determine if an air bubble event is detected, each processing strategy of the plurality of processing strategies being able to independently determine if the air bubble event is detected; and if the air bubble event is detected, generate a work order for the CT scanner.

Example 2: The system of Example 1, wherein a first processing strategy of the plurality of processing strategies includes determining if a percent of tilted scans with view corrections satisfies a first threshold and if the first threshold is satisfied, determining the air bubble event is detected.

Example 3: The system of Example 2, wherein the first threshold is satisfied if the percent of tilted scans with view corrections at least meets the first threshold.

Example 4: The system of Example 1, wherein a second processing strategy of the plurality of processing strategies includes determining if a percent of tilted scans with view corrections satisfies a second threshold.

Example 5: The system of Example 4, wherein second threshold is satisfied if the percent of tilted scans with view corrections exceeds the second threshold and the second processing strategy of the plurality of processing strategies further includes determining if the percent of tilted scans with view corrections satisfies a third threshold.

Example 6: The system of Example 5, wherein third threshold is satisfied if the percent of tilted scans with view corrections is less than the third threshold and the second processing strategy of the plurality of processing strategies further includes determining if a percent view corrections on tilted scans satisfies a fourth threshold.

Example 7: The system of Example 6, wherein fourth threshold is satisfied if the percent of view corrections on tilted scans exceeds the fourth threshold and the second processing strategy of the plurality of processing strategies further includes determining if a number of tube arcs satisfies a fifth threshold.

Example 8: The system of Example 7, wherein fifth threshold is satisfied if the number of tube arcs exceeds the fifth threshold and the second processing strategy of the plurality of processing strategies further includes determining if the number of tube arcs satisfies a sixth threshold.

Example 9: The system of Example 8, wherein the sixth threshold is equal to an average number of tube arcs over a first time period plus a standard deviation of the average number of tube arcs over the first time period.

Example 10: The system of Example 9, wherein sixth threshold is satisfied if the number of tube arcs exceeds the sixth threshold.

Example 11: The system of Example 10, wherein if the first threshold, the second threshold, the third threshold, the fourth threshold, the fifth threshold, and the sixth threshold are satisfied, determining the air bubble event is detected.

Example 12: A system for evaluating a plurality of medical devices over an at least one network is provided. The system comprising: an event detection controller; a plurality of network access devices; and a plurality of technician mobile computing devices. Each network access device is operatively coupled to a respective one of the plurality of medical devices. Each network access device receiving log data from the respective medical device and processing the log data to provide a collection of device data to the event detection controller over the at least one network. The event detection controller is configured to: receive the collection of device data; evaluate the collection of device data to identify a plurality of events; generating a first work order based on a first event of the plurality of events, the first event being associated with a first medical device of the plurality of medical devices and having a first severity level; generating a second work order based on a second event of the plurality of events, the second event being associated with a second medical device of the plurality of medical devices and having a second severity level, the second severity level being higher than the first severity level; sending a first notification of the first work order to a first technician mobile computing device within a first time period; and sending a second notification of the second work order to a second technician mobile computing device within a second time period, the second time period being shorter than the first time period.

Example 13: The system of Example 12, wherein the event detection controller is further configured to: determine a third event of the plurality of events for the first medical device of the plurality of medical devices; determine if the first work order is still open; if the first work order is still open, update the first work order to include the third event; and if the first work order is closed, generate a third work order based on the third event of the plurality of events.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system for evaluating a plurality of medical devices including a CT scanner over at least one network, the system comprising:
an event detection controller configured to communicate via a plurality of private network connections, wherein each private network connection enables communication between the event detection controller and a respective network access device of a plurality of network access devices; and
the plurality of network access devices, each network access device operatively coupled, at a respective facility, to a respective one of the plurality of medical devices, each network access device:
receiving log data generated by the respective medical device; and
processing the log data to provide a collection of device data to the event detection controller over a respective private network connection via a facility network of the respective facility,
wherein the event detection controller is further configured to:
query the device data associated with the CT scanner to determine if any view corrections were executed for tilted scans;
evaluate a plurality of processing strategies to determine if an air bubble event is detected, each processing strategy of the plurality of processing strategies being able to independently determine if the air bubble event is detected; and
if the air bubble event is detected, generate a work order for the CT scanner.

2. The system of claim 1, wherein a first processing strategy of the plurality of processing strategies includes determining if a percent of tilted scans with view corrections satisfies a first threshold and if the first threshold is satisfied, determining the air bubble event is detected.

3. The system of claim 2, wherein the first threshold is satisfied if the percent of tilted scans with view corrections at least meets the first threshold.

4. The system of claim 1, wherein a second processing strategy of the plurality of processing strategies includes determining if a percent of tilted scans with view corrections satisfies a second threshold.

5. The system of claim 4, wherein the second threshold is satisfied if the percent of tilted scans with view corrections exceeds the second threshold and the second processing strategy of the plurality of processing strategies further includes determining if the percent of tilted scans with view corrections satisfies a third threshold.

6. The system of claim 5, wherein the third threshold is satisfied if the percent of tilted scans with view corrections is less than the third threshold and the second processing strategy of the plurality of processing strategies further includes determining if a percent view corrections on tilted scans satisfies a fourth threshold.

7. The system of claim 6, wherein the fourth threshold is satisfied if the percent of view corrections on tilted scans exceeds the fourth threshold and the second processing strategy of the plurality of processing strategies further includes determining if a number of tube arcs satisfies a fifth threshold.

8. The system of claim 7, wherein the fifth threshold is satisfied if the number of tube arcs exceeds the fifth threshold and the second processing strategy of the plurality of processing strategies further includes determining if the number of tube arcs satisfies a sixth threshold.

9. The system of claim 8, wherein the sixth threshold is equal to an average number of tube arcs over a first time period plus a standard deviation of the average number of tube arcs over the first time period.

10. The system of claim 9, wherein the sixth threshold is satisfied if the number of tube arcs exceeds the sixth threshold.

11. The system of claim 10, wherein if the first threshold, the second threshold, the third threshold, the fourth threshold, the fifth threshold, and the sixth threshold are satisfied, determining the air bubble event is detected.

12. The system of claim 1, wherein the log data is generated by each respective medical device separately from electronic personal health information for a patient utilizing the respective medical device.

13. A method for monitoring a plurality of medical devices via a plurality of private network connections, the method comprising:
obtaining, via a respective private network connection of the plurality of private network connections to a network access device communicatively coupled, at a respective facility, with a respective medical device of the plurality of medical devices, device data of the respective medical device, wherein:
the device data comprises log data generated by the respective medical device separately from electronic personal health information, and
the respective private network connection enables communication via a facility network of the respective facility;
processing the device data to determine if any view corrections were executed for tilted scans;
evaluating a plurality of processing strategies to determine if an air bubble event is detected, each processing strategy of the plurality of processing strategies being able to independently determine if the air bubble event is detected; and
in response to determining an air bubble event is detected, generating a work order for a medical device of the plurality of medical devices associated with the detected air bubble event.

14. The method of claim 13, wherein a first processing strategy of the plurality of processing strategies includes determining if a percent of tilted scans with view corrections satisfies a first threshold and if the first threshold is satisfied, determining the air bubble event is detected.

15. The method of claim 14, wherein the first threshold is satisfied if the percent of tilted scans with view corrections at least meets the first threshold.

16. The method of claim 13, wherein a second processing strategy of the plurality of processing strategies includes determining if a percent of tilted scans with view corrections satisfies a second threshold.

17. The method of claim 16, wherein the second threshold is satisfied if the percent of tilted scans with view corrections exceeds the second threshold and the second processing strategy of the plurality of processing strategies further includes determining if the percent of tilted scans with view corrections satisfies a third threshold.

18. The method of claim 17, wherein the third threshold is satisfied if the percent of tilted scans with view corrections is less than the third threshold and the second processing strategy of the plurality of processing strategies further includes determining if a percent view corrections on tilted scans satisfies a fourth threshold.

19. The method of claim 18, wherein the fourth threshold is satisfied if the percent of view corrections on tilted scans exceeds the fourth threshold and the second processing strategy of the plurality of processing strategies further includes determining if a number of tube arcs satisfies a fifth threshold.

20. The method of claim 19, wherein the fifth threshold is satisfied if the number of tube arcs exceeds the fifth threshold and the second processing strategy of the plurality of processing strategies further includes determining if the number of tube arcs satisfies a sixth threshold.

* * * * *